Oct. 18, 1927.
F. B. SUGG
1,646,326
MOVABLE HEADLIGHT
Filed Aug. 11, 1924
2 Sheets-Sheet 1
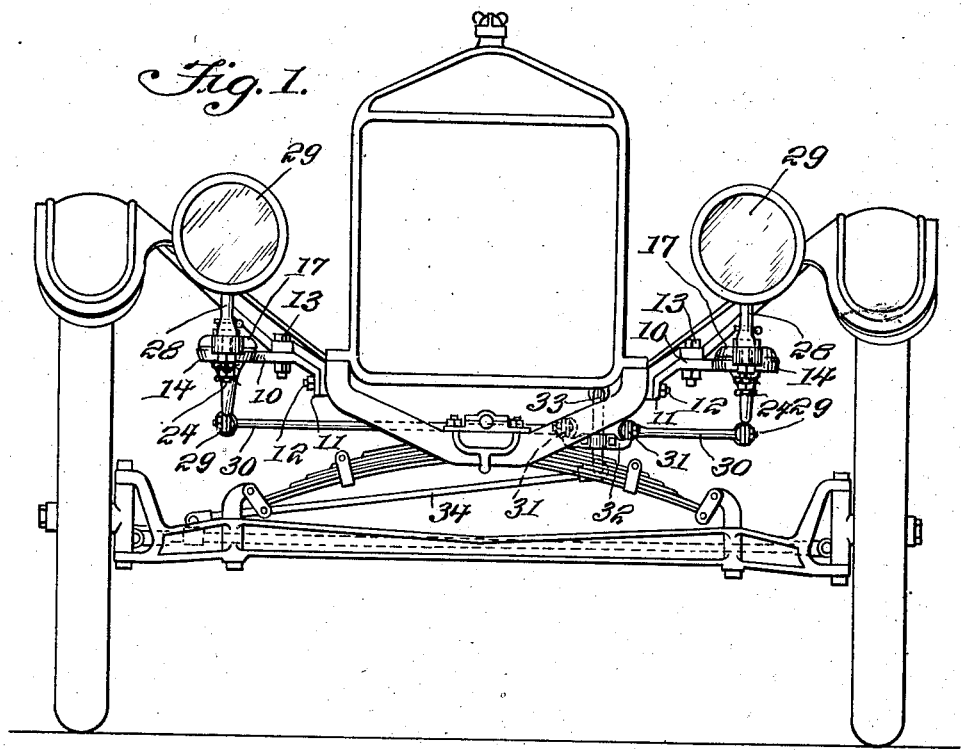
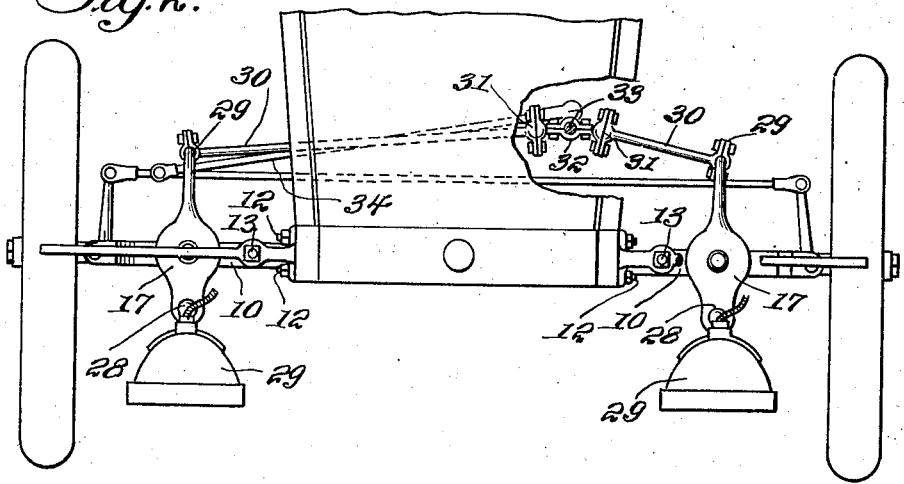
Frederick B. Sugg
INVENTOR
BY Victor J. Evans
ATTORNEY
WITNESS: J. T. L. Wright Oct. 18, 1927.  F. B. SUGG  1,646,326
MOVABLE HEADLIGHT
Filed Aug. 11, 1924   2 Sheets-Sheet 2
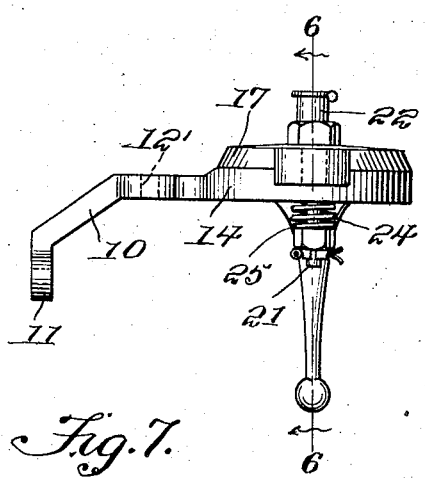
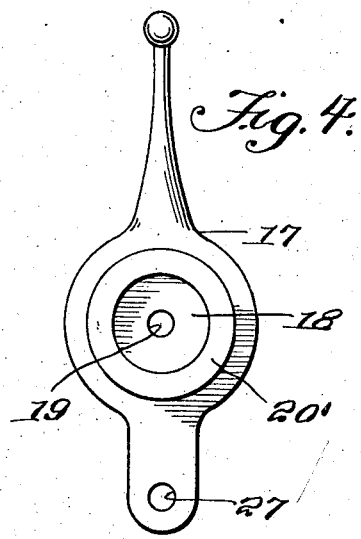
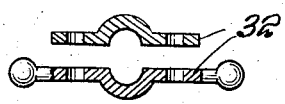
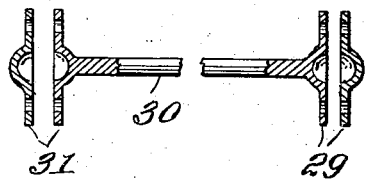
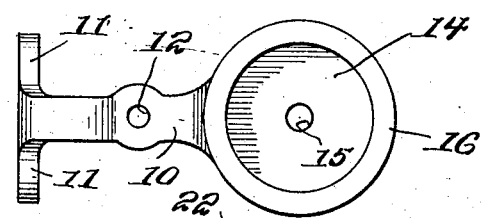
Frederick B. Sugg
INVENTOR
BY Victor J. Evans
ATTORNEY
WITNESS: J. T. L. Wright Patented Oct. 18, 1927.

1,646,326

UNITED STATES PATENT OFFICE.

FREDERICK BETTON SUGG, OF OZARK, ALABAMA.

MOVABLE HEADLIGHT.

Application filed August 11, 1924. Serial No. 731,415.

This invention relates to improvements in the lighting systems of automobiles, an object being to provide means whereby the head lamps of an automobile will be moved horizontally through the operation of the steering mechanism so as to project their rays of light in the direction of travel of the automobile and properly illuminate the roadway upon curves as well as upon straight roads.

Another object of the invention is the provision of means for mounting the head lamps whereby they will be capable of horizontal pivotal movement, being yieldingly held in position so as to prevent accidental movement and rattling, together with simple and reliable means for connecting the lamps to the automobile steering mechanism.

With the above and other objects in view, the invention further includes the following novel features and details of construction, to be hereinafter more fully described, illustrated in the accompanying drawings and pointed out in the appended claim.

In the drawings:—

Figure 1 is a front elevation of a portion of an automobile constructed in accordance with the invention.

Figure 2 is a top plan view of the same partly broken away.

Figure 3 is a side elevation of one of the bearing brackets and the pivotally movable lamp lever supported thereon.

Figure 4 is a top plan view of the lever.

Figure 5 is a similar view of the bearing bracket.

Figure 6 is a sectional view on the line 6—6 of Figure 3.

Figure 7 is a detail view of the steering arm clamp.

Figure 8 is a detail view partly broken away showing one of the connecting rods.

Referring to the drawings in detail wherein like characters of reference denote corresponding parts, the reference character 10 indicates a bearing bracket, one of which is secured upon each side of the automobile radiator. These brackets each include apertured ears 11 for the passage of bolts 12, by means of which they are attached to the frame of the automobile. The brackets 10 are further provided with openings 12' for the passage of bolts 13, the said bolts engaging the front fenders and fender braces so that the brackets will be rigidly held in place.

The brackets 10 extend laterally and horizontally and each includes a bearing plate 14 which is provided with a centrally arranged opening 15 and an upwardly extending marginal flange 16.

Mounted upon the bearing plates are horizontally movable lamp levers or arms 17, the latter including bearing plates 18 which are also provided with centrally arranged openings 19 and annular flanges 20. The flanges 20 are received within the flanges 16 of the plates 14 so that the plates 14 and 18 are spaced apart and provide a lubricant chamber 20'.

Pivot bolts 21 extend through the openings 15 and 19 and serve to hold the plates together, while the upper ends of these bolts carry oil or lubricant cups 22 by means of which lubricant is supplied to the chambers 20' through passages 23 in the bolts 21. Springs 24 surround the bolts and bear against the under faces of the plates 14 and against a washer 25 which is held in place by a nut 26. The spring acts to hold the plates 14 and 18 against accidental relative movement and the tension of this spring may be adjusted by the nut 26.

One end of the lamp lever 17 is provided with an opening 27 for the reception of the lower end of a lamp post 28 so that head lamps 29 may be located upon opposite sides of the radiator. The opposite ends of the levers 17 extend downwardly and have ball and socket connections 29 with connecting rods 30.

The rods 30 have ball and socket connections 31 with a steering arm clamp 32, the latter being clamped transversely of the steering arm 33 of the automobile. As this arm is connected by a rod 34 with the connecting rod of the steering knuckle arms in the ordinary manner, operation of the steering mechanism will move the lamps pivotally so that their rays of light will be projected in the direction of travel.

The invention is susceptible of various changes in its form, proportions and minor details of construction and the right is herein reserved to make such changes as properly fall within the scope of the appended claim.

Having described the invention what is claimed is:—

In an automobile. a bearing bracket secured to the automobile upon each side of the radiator, each of the brackets including a horizontally disposed plate having an opening therein, a lamp carrying arm mounted for horizontal swinging movement upon each of the brackets, an apertured bearing plate for each arm, the apertured plates of the arms being adapted to be arranged in opposed relation to the plates of the brackets, annular bearing ribs upon the opposed faces of the plates providing a lubricant chamber, pivot bolts extending through the openings of the plates and having lubricant passages therein communicating with the lubricant chambers, springs mounted upon the bolts to provide yieldable frictional engagement between the ribs of the plates and means connecting the lamp carrying arms with the steering mechanism.

In testimony whereof I affix my signature.

FREDERICK BETTON SUGG.